United States Patent [19]

Hamill

[11] Patent Number: 5,090,498

[45] Date of Patent: Feb. 25, 1992

[54] WATER WASH/OIL WASH CYCLONIC COLUMN TANK SEPARATION SYSTEM

[75] Inventor: James Hamill, Aberdeen, Scotland

[73] Assignee: M-I Drilling Fluids Company, Houston, Tex.

[21] Appl. No.: 541,887

[22] Filed: Jun. 20, 1990

Related U.S. Application Data

[63] Continuation-in-part of Ser. No. 497,939, Mar. 23, 1990, abandoned.

[30] Foreign Application Priority Data

Nov. 10, 1989 [GB] United Kingdom ............... 8925500
May 3, 1990 [GB] United Kingdom ............... 9012087

[51] Int. Cl.$^5$ ............................................. E21B 21/06
[52] U.S. Cl. ..................................... 175/206; 175/66; 175/207; 134/109
[58] Field of Search ....................... 175/66, 206, 207; 210/179-181, 770; 134/19, 105, 109; 196/121, 124; 202/105, 150; 34/68; 432/239

[56] References Cited

U.S. PATENT DOCUMENTS

| | | |
|---|---|---|
| 3,040,822 | 6/1962 | Graham et al. ............... 175/70 |
| 3,140,747 | 7/1964 | Mitacek ........................ 175/66 |
| 3,688,781 | 9/1972 | Talley, Jr. . |
| 3,693,733 | 9/1972 | Teague . |
| 3,713,499 | 1/1973 | Arscott et al. . |
| 3,737,037 | 6/1973 | Bone, III . |
| 4,040,866 | 8/1977 | Mondshine . |
| 4,192,392 | 3/1980 | Messines et al. . |
| 4,208,285 | 6/1980 | Sample, Jr. . |
| 4,209,381 | 6/1980 | Kelly, Jr. . |
| 4,222,988 | 9/1980 | Barthel ......................... 175/66 |
| 4,250,974 | 2/1981 | Heilhecker et al. . |
| 4,387,514 | 6/1983 | McCaskill, Jr. . |
| 4,411,074 | 10/1983 | Daly ............................. 175/66 |
| 4,424,081 | 1/1984 | Giguere . |
| 4,451,377 | 5/1984 | Luxemburg . |
| 4,453,319 | 6/1984 | Morris ........................ 175/206 |
| 4,546,783 | 10/1985 | Lott . |
| 4,595,422 | 6/1986 | Hill et al. . |
| 4,645,608 | 2/1987 | Rayborn . |
| 4,683,963 | 8/1987 | Skinner . |
| 4,725,362 | 2/1988 | Dugat .......................... 175/66 |
| 4,913,245 | 4/1990 | Skinner ........................ 175/66 |
| 4,836,3021 | 6/1989 | Heilhecker et al. . |

OTHER PUBLICATIONS

The Principle of the BWN Vortoil Hydrocyclone-The 4-in-1 Concept (undated).
The Oil and Gas Journal, Aug. 14, 1972, Cuttings Can Meet Offshore Environment Specifications, John L. Kennedy.
Babcock, Process Engineering Division, Brochure (undated).
Solids Control Services B.V., Cutting Cleaner Brochure (undated).

Primary Examiner—Terry Lee Melius
Attorney, Agent, or Firm—Arnold, White & Durkee

[57] ABSTRACT

The invention is directed to a method and apparatus for removing oil base drilling mud or like contaminants from drill cuttings. A continuous phase liquid, such as, base oil or wash water, is used to wash the contaminants from the cuttings. The continuous phase liquid and the contaminants removed from the cuttings are separated for recirculation and reuse. The separation system (10) of the invention includes a wash drum (14) for agitating the contaminated cuttings and continuous phase liquid together, a drying screen (16) for separating the larger solids from the liquid phase, a first column tank (18) and a pair of centrifuges (24 and 26) for separating the smaller solids from the liquid phase, and second and third column tanks (20 and 22) for separating the continuous phase liquid from the removed contaminants. When the continuous phase liquid is aqueous, for example, salt water mixed with the detergent, the apparatus of the invention includes a de-oiling, liquid/liquid hydrocyclone (30) to facilitate the separation of the continuous phase liquid and the removed contaminants. To further reduce oil contaminants on the drill cuttings to 0-1% dry weight prior to cuttings disposal, the system includes a low temperature thermal processor (500) which receives stabilized solids from the drying screen (16) and the centrifuges (24 and 26). The low temperature thermal processor (500) includes a heated hopper (502), crusher rollers (504), and agitator dryer (506), a condenser (508), and a condensate column tank (510).

26 Claims, 3 Drawing Sheets

WATER WASH/OIL WASH CYCLONIC COLUMN TANK SEPARATION SYSTEM

CROSS-REFERENCE TO RELATED APPLICATIONS

This application is a continuation-in-part of application Ser. No. 497,939, filed on Mar. 23, 1990, abandoned.

BACKGROUND OF THE INVENTION

This invention relates to methods and apparatus for removing oil base drilling mud or like contaminants from drill cuttings and, more particularly, it concerns a system and method which combines the use of centrifugal, cyclonic, filtration and gravitational separation techniques and which incorporates a continuous phase liquid, such as base oil or salt water with surfactants, which washes the contaminants from the cuttings, is separated from the contaminants, and is recycled through the system.

A variety of systems and techniques have been developed to clean oil or oil-based drilling mud from drill cuttings in order to provide for an environmentally safe disposal of the cuttings. Recently, there has been a great deal of activity directed toward development of a practical system capable of cleaning contaminated drill cuttings at an offshore location so as to allow for disposal of the cleaned cuttings directly into the ocean. Without such a system for cleaning contaminated cuttings, the offshore use of oil muds is a very expensive proposition since environmental regulations require that oil-contaminated, drilled cuttings be hauled from the offshore rig to an onshore disposal facility.

One approach to cleaning oil contaminated or coated cuttings is to burn the oil off the cuttings using, for example, very high temperature heat lamps or steam. Examples of this approach are disclosed in U.S. Pat. Nos. 4,209,381, issued on June 24, 1980; 4,595,422, issued on June 17, 1986; and 4,683,963, issued on Aug. 4, 1987. Such systems for burning off the oil from the cuttings suffer from drawbacks, such as, insurance problems due to the questionable use of high heat on an offshore rig and only a partial cleaning of the cuttings caused by an unequal heating of the contaminated cuttings.

Another and more practical approach to the offshore cleaning of oil contaminated cuttings is to wash the cuttings with a detergent solution, separate the cuttings from the mixture of wash solution and oil, and then discharge the cleaned cuttings into the ocean. U.S. Pat. Nos. 3,688,781 issued on Sept. 5, 1972; 3,693,733, issued on Sept. 26, 1972; and 4,546,783, issued on Oct. 15, 1985 disclose examples of such washing systems or associated methods. These conventional washing systems are less than desirable because they do not provide the necessary cleaning, the washing solution itself may pose a threat to the environment, or they require periodic shutting down of the system to allow for the settling of oily particles or for the removal of a highly contaminated washing solution which must be hauled to an onshore disposal site.

Yet another approach to cleaning oil contaminated drill cuttings involves the use of specialized solvents which are usually miscible with oil but essentially immiscible with water and which may be in liquid form during one stage of the cleaning process and in vapor form during another stage of the process. For example, U.S. Pat. No. 4,836,302 discloses a complex apparatus for removing and recovering oil and other oil-based drilling mud additives from drill cuttings using an easily vaporized solvent, such as trichlorotrifluoethane. Such a complex separation system is undesirable not only from the standpoint of unit cost, but also high operating costs and problems associated with the use of volatile and/or environmentally dangerous solvents. Other examples of specialized cleaning solvents are disclosed in U.S. Pat. Nos. 4,040,866, issued on Aug. 9, 1977, and 4,645,608 issued on Feb. 24, 1987.

In light of the above, there is a need for an improved system for thoroughly and safely cleaning oil or oil mud contaminated drill cuttings prior to disposal.

SUMMARY OF THE INVENTION

In accordance with the present invention, a method and apparatus for removing oil base drilling mud or like contaminants from drill cuttings is provided by which a continuous phase liquid is used to wash the contaminants from the cuttings and then the continuous phase liquid and removed contaminants are separated for recirculation and reuse. The process of the present invention is adapted for use with either an aqueous or non-aqueous continuous phase liquid.

In the practice of the present invention, the removal of oil or like contaminants from drill cuttings is effected using a multi-stage and yet continuous cleaning and separation process. In the preliminary stages of the present process, the contaminated cuttings are washed, larger sized cuttings are separated from the remaining smaller sized cuttings, removed contaminants and washing solution, and then the separated out larger sized cuttings are dried prior to disposal. In the intermediate stages of the present process, smaller cuttings are separated from the washing solution and removed contaminants. In the final stages of the present process, the removed contaminants and the washing solution are separated from each other, the washing solution is recirculated for washing contaminated cuttings, and the removed contaminants are recycled for reuse in an active mud system.

In accordance with a preferred embodiment, the separation system of the present invention includes a low temperature thermal processor for further reducing the oil content to about 0-1% dry weight. The low temperature thermal processor of the present invention includes an agitator dryer arrangement which produces a discharge having a uniform 0-1% oil content at low temperatures and with relatively small-sized dryer units because the feed stock has been stabilized prior to entry into the dryer.

Accordingly, a principal object of the present invention is to provide a method and apparatus for removing oil or like contaminants from oil field produced or drill cuttings. Another and more specific object of the present invention is the provision of a process for removing oil or oil-based drilling mud from drill cuttings to below 10 percent dry weight oil on the cuttings using a continuous phase liquid, such as, base oil or salt water with surfactants. Yet another object of the present invention is to provide a semi-automatic cleaning process so as to reduce work intensity and field manning levels. Still yet another object of the present invention is the provision of a low temperature thermal processor to further reduce the oil content of the cuttings and to reduce the overall cost of any additional downstream drying process. Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENTS

Figure 1:
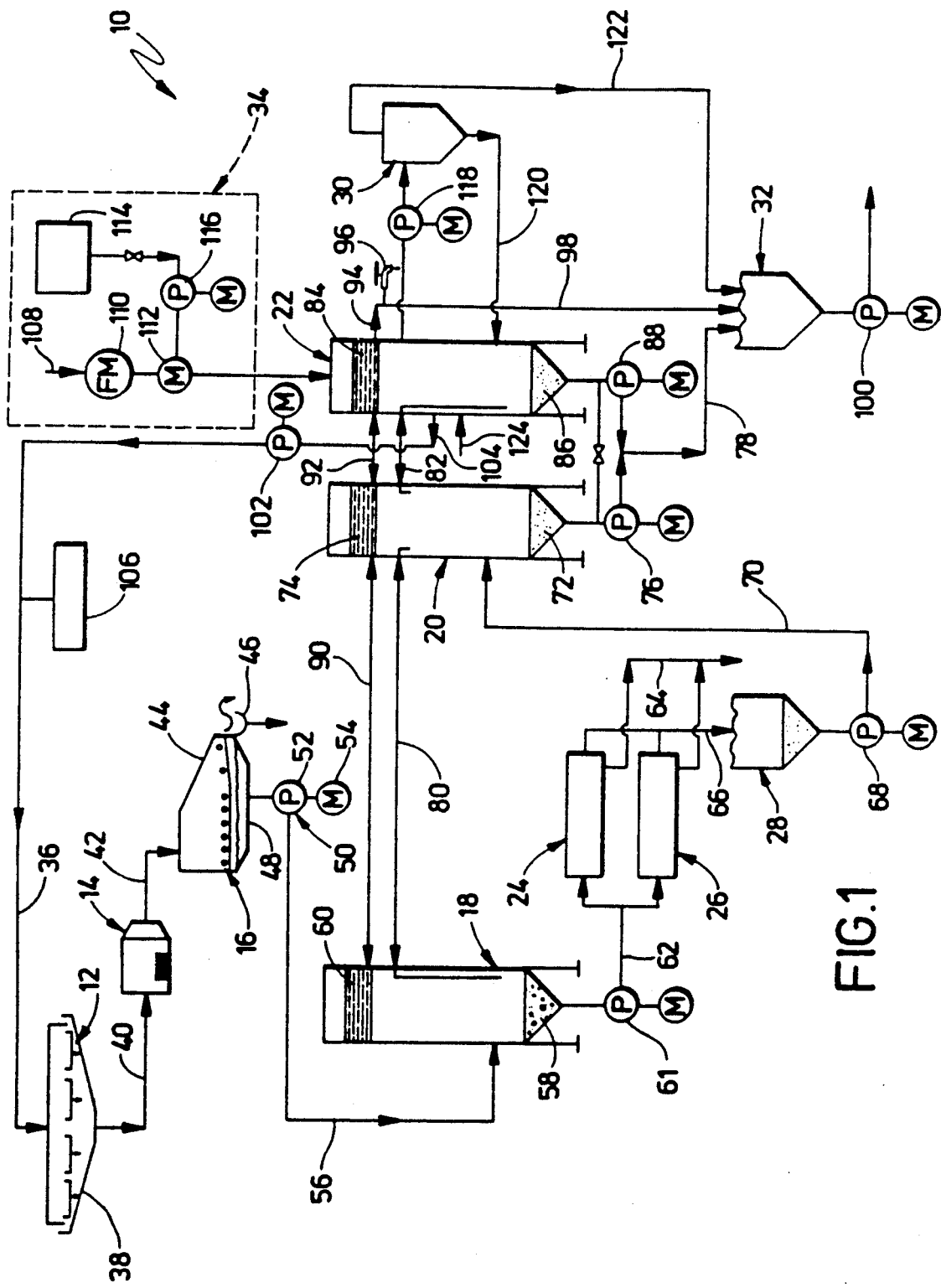
FIG. 1 is a schematic diagram illustrating an exemplary embodiment of the water wash cyclonic column tank separation system of the present invention.

In FIG. 1 of the drawings, an exemplary water wash cyclonic column tank separation system of the present invention is generally designated by the reference numeral 10 and shown to include as major components platform shakers 12, a wash drum 14, a drying screen 16, first, second, and third column tanks 18, 20, and 22, a pair of centrifuges 24 and 26, a small catch tank 28, a liquid/liquid hydrocyclone 30, a holding tank 32, and a washing solution supply 34.

Drill or formation cuttings contaminated with oil, oil-based drilling mud or the like are supplied in a conventional manner to the platform shakers 12, for example, by a rig solids control system (not shown). A wash water conduit 36 supplies wash water, i.e. sea water mixed with one or more surfactants, which flushes the contaminated cuttings from the platform shakers 12, into a catch basin 38, through a conduit 40, and into the wash drum 14. In the wash drum 14, the cuttings and wash water are gently agitated together to thereby wash the oil, oil mud, or like contaminants from the cuttings. The wash water, cuttings, and dispersed oil-like contaminants exit the wash drum 14 along a conduit 42 and land on the vibrating drying screen 16.

In accordance with a preferred embodiment, the drying screen 16 has a 120×120 mesh screen size and a screening area of 32 square feet. The screen 16 separates larger cuttings of about 117 microns or more in size from liquids and small cuttings of less than 117 microns which follow the liquids through the screen. The separated out larger cuttings climb a 5 degree positive incline of the screen 16 and pass through a series of air curtains produced, for example, by strip air amplifiers 44. The air curtains dry the cleaned cuttings before they reach a screen discharge location 46 whereat they are sampled and then disposed of, for example, by being flushed overboard by salt water or fed to a thermal processor (FIG. 3) for further cleaning prior to disposal.

The liquid phase (wash water, oil, emulsifiers, etc.) and small solid particles which passed through the screen 16 collect as a suspension in a catch pan 48 below the screen 16. A pump 50, such as a Mono pump, having a fluid contacting pump section 52 and a motor 54 draws the suspension from the catch pan 48 and forces the suspension along a conduit 56 to the first column tank 18. A dense suspension 58 of, for example, wash water, emulsifiers from the oil mud, and fine solids settles to the bottom of the first column tank, while any free oil 60 migrates to the upper surface of the wash water in the first column tank 18. A Mono pump 61 sucks the dense suspension 58 from the bottom of the column tank 18 and feeds it along a pipe 62 to the pair of centrifuges 24 and 26. It is preferred that the centrifuges 24 and 26 are high "G" centrifuges, for example, 3250 rpm, 5 micron cut point centrifuges for separating all solids above 5 microns in size from the liquid of the suspension. The solids removed by the centrifuges 24 and 26 travel along a conduit 64 and are sampled and disposed of, for example, by being flushed overboard with sea water or fed to a thermal processor (FIG. 3) for further cleaning prior to disposal. The liquid output of the centrifuges 24 and 26 (wash water, oil, emulsifiers, and solids having a size of 5 microns or less) travels along a conduit 66 to the small catch tank 28. A Mono pump 68 feeds the liquid from the catch tank 28 to the second column tank 20 via a conduit 70.

A high density liquid phase 72 including emulsifiers, tied up oil, mud additives, and solids below about 5 microns settles to the bottom of the column tank 20, while any oil 74 freed during centrifuging will migrate to the upper surface of the wash water in the second column tank 20. The high density liquid phase 72 at the bottom of the second column tank 20 is periodically drained off by a Mono pump 76 and transferred to the recovered oil and emulsifier holding tank 32.

The wash water in the second column tank 20 is equalized with that in the first and third column tanks 18 and 22 along conduits 80 and 82, respectively, each being located at a high level on tank, but below the upper surface of the wash water in each of the tanks. In the third column tank 22, any free oil 84 migrates to the upper surface of the wash water, and high density liquids 86 settle to the tank bottom for transfer to the recovered oil and emulsifier holding tank 32 by a Mono Pump 88.

The first and second column tanks 18 and 20 have a common high level equalizer line 90 which determines the upper surface level of the wash water and allows for the passage of free oil therebetween. The second and third column tanks 20 and 22 are joined by a similar high level equalizer line 92. The third column tank 22 includes a high level line 94 at the upper wash water surface and from which the free oil 84 can be sampled at 96 and drained by gravity along a conduit 98 into the holding tank 32. It is contemplated that each of the column tanks 18, 20, and 22 may have their own high level equalizer line which provides for sampling of the free oil and for draining by gravity free oil into the holding tank 32. It is preferred that the first, second, and third column tanks 18, 20 and 22 are each 50 BBL tanks. A Mono pump 100 feeds the recovered oil and emulsifiers from the holding tank 32 to an active system premix tank (not shown) for reuse in a conventional active mud system.

A Mono pump 102 pulls wash water from the third column tank 22 along a relatively high level line 104 and pumps this used wash water along the conduit 36 to flush the cuttings from the cuttings ditch to start the process over again. The wash water in the line 36 is heated by a heater 106 in order to improve washing and separation results.

The wash water supply 34 provides wash water to the third column tank 22 in order to maintain the necessary volume and strength of wash water to achieve the desired process results. The wash water supply 34 includes a source of seawater 108, a flow meter 110, a mixer 112, a neat detergent bulk tank 114, and a Mono pump 116. It is preferred that the salt water to detergent ratio of the wash water is 97% salt water and 3% detergent.

A Mono pump 118 feeds wash water from the third column tank 22 to the de-oiling, liquid/liquid hydrocyclone 30. In accordance with a preferred embodiment, the hydrocyclone 30 is a BWN Vortoil hydrocyclone which will reduce any oil circulating in the wash water to about 40 PPM at a wash water process rate of 8.5 BBL/MIN. Substantially oil-free wash water is returned from the hydrocyclone 30 to the column tank 22 along a conduit 120, while the oil output of the hydrocyclone 30 is fed to the holding tank 32 via a line 122. A salt water input 124 is provided on the third column tank 22 to introduce fresh salt water as necessary.

Figure 2:
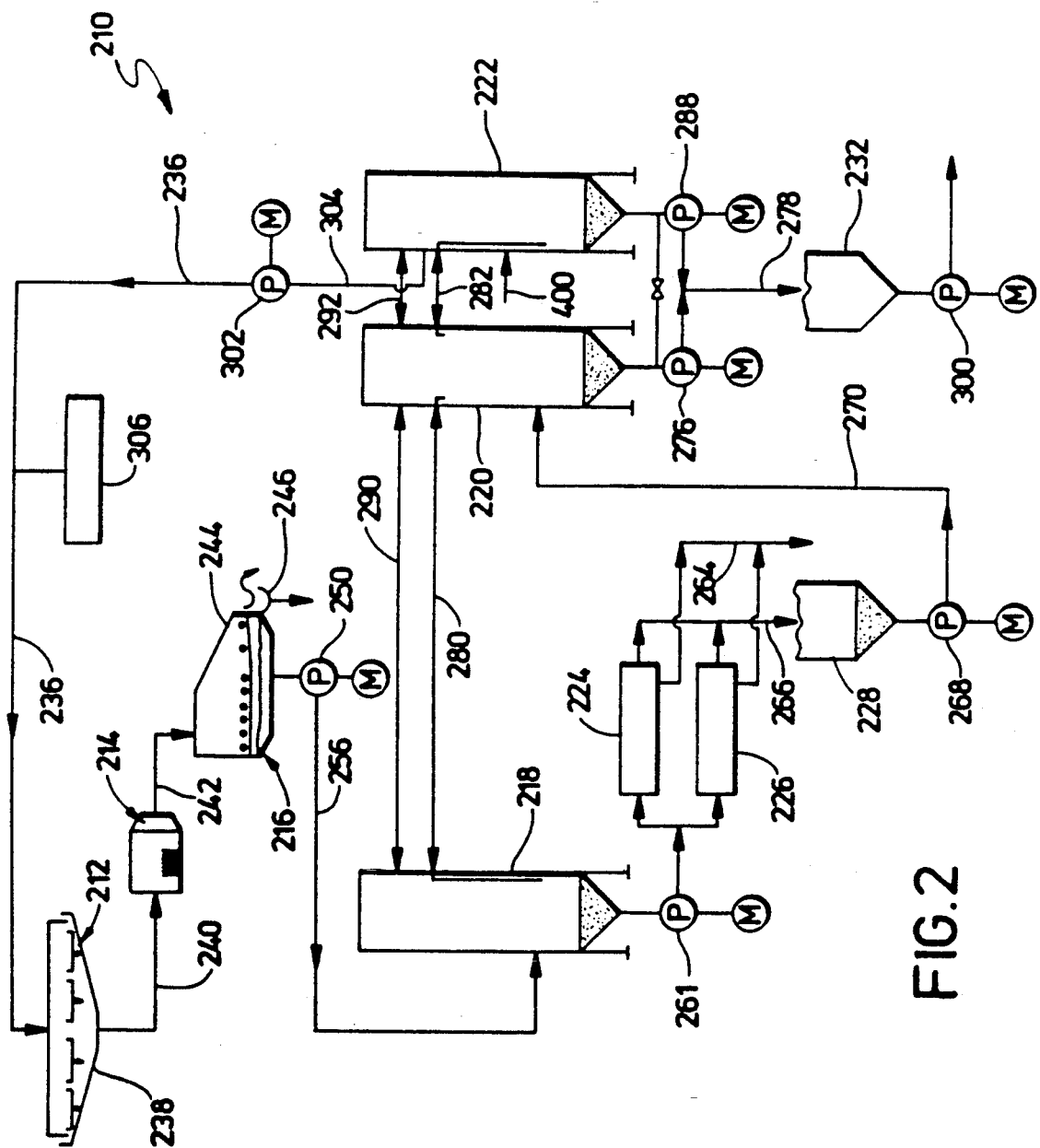
FIG. 2 is a schematic diagram representing an exemplary embodiment of the oil wash cyclonic column tank separation system of the present invention.

In FIG. 2 of the drawings, an exemplary oil wash cyclonic column tank separation system is generally designated by the reference numeral 210 and shown to include a number of the same major components as the exemplary system 10 shown in FIG. 1. Parts in FIG. 2 which are like those in FIG. 1 are designated by the same reference numerals as those of FIG. 1 but increased by 200. For example, the first, second, and third column tanks 218, 220, and 222 of FIG. 2 are of substantially the same construction as the column tanks 18, 20, and 22 of FIG. 1. In that the components which are common to FIGS. 1 and 2 operate in the same or a similar fashion in either system, a detailed description of the system shown in FIG. 2 is not necessary. However, a description of the salient differences between the two systems is set forth below. Since the separation system shown in FIG. 2 incorporates a non-aqueous base oil as the continuous phase liquid, rather than the detergent wash water used in the system shown in FIG. 1, the system 210 has no need for a liquid/liquid hydrocyclone (30, FIG. 1) or a wash water supply (34, FIG. 1). Nevertheless, the system 210 includes a base oil supply line 400 which supplies base oil to the third column tank 222 in order to maintain the volume of base oil in the system.

In accordance with a preferred embodiment, the system 210 (FIG. 2) operates in a similar fashion to that of the system 10 (FIG. 1) in that solids of 117 microns or greater in size are separated from the liquid phase by the drying screen 216, solids of greater than 5 microns in size are separated from the liquid phase by the centrifuges 224 and 226, the base oil is recirculated through the system by the Mono pump 302, and the oil and emulsifiers removed from the cuttings are collected in the holding tank 232 and recycled to an active mud system (not shown).

Figure 3:
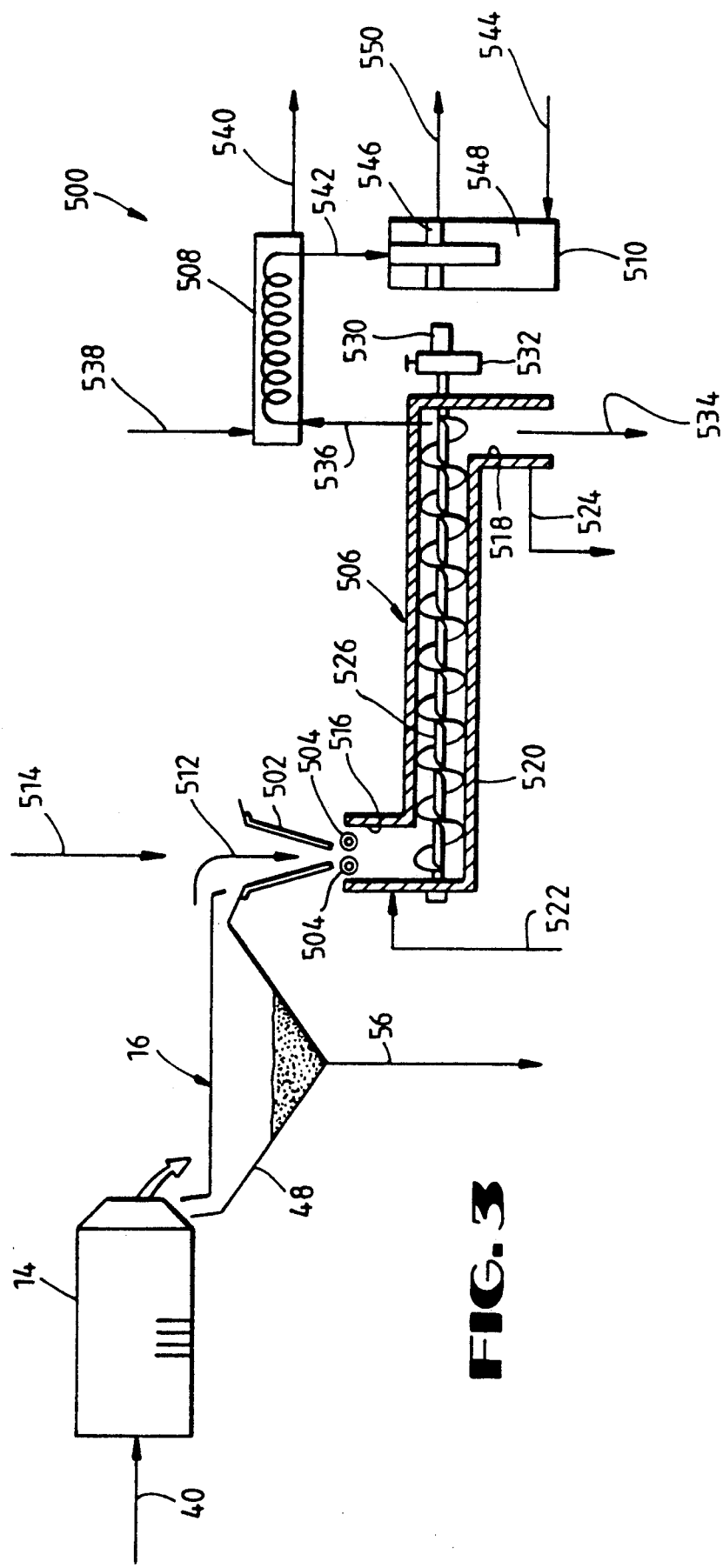
FIG. 3 is schematic diagram illustrating an exemplary embodiment of the low temperature thermal processor of the present invention.

As shown in FIG. 3 of the drawings, the separation system 10 of FIG. has been modified to include an exemplary low temperature thermal processor generally designated by the reference numeral 500 and shown to include a heated hopper 502, a pair of opposing crusher rollers or roller mills 504, an agitator dryer 506, a condenser 508, and a condensate column tank 510.

The heated hopper 502 receives relatively large-sized washed and partially dried cuttings 512 from the drying screen 16 and intermittently receives relatively smaller-sized cuttings 514 from the solids output conduit 64 of the centrifuges 24 and 26 (FIG. 1). The cuttings 512 and 514 received by the hopper 502 are heated and fed to the pair of crusher rollers or roller mills 504 which crush the cuttings to increase their surface area and release any oil trapped inside the cuttings. The washed, heated and crushed, and, as such, stabilized cuttings which pass through the rollers 504 enter a first end 516 of the agitator dryer 506 with a 10% or less oil content and exit a second end 518 of the dryer 506 with a 0-1% oil content by dry weight.

The agitator dryer 506 is preferably a vacuum agitator dryer such as a ROTA-BLADE ™ vacuum dryer produced by Deutsche Babcock Anlagen of West Germany and marketed in the U.S. by Paul O. Abbe, Inc. More particularly, in accordance with a preferred embodiment, the dryer 506 is a ROTA-BLADE ™ vacuum dryer model 1500/18 having a 5 ft. nominal diameter, 10.5 ft. cylinder length, 170 ft.$^2$ total volume, 301.2 ft.$^2$ heating surface, 15 H.P. motor, 20 ft. total length, and a 12 ft. total height. Although a vacuum dryer unit is preferred and more efficient at lower temperatures (200° C.), it is to be understood that a positive pressurized dryer unit can be utilized in the thermal processor of the present invention.

The agitator dryer 506 includes a heated jacket 520 having a heat source input 522 and output 524. The input 522 and output 524 provide for the flow of a heated material such as steam at 160° C. or hot oil at 200° C. through the dryer jacket 520. The steam is produced, for example, by a steam boiler while the oil is heated by, for example, an electric oil heater unit. In addition to the jacket 520, other dryer components such as a dryer drive head, dead-end head, front plate, loading cupola, dome, agitator assembly (shaft and/or blades), and/or vapor cupola can be heated to maximize the heated surface area and to avoid condensation within the dryer.

The dryer 506 further includes an agitator shaft 526 having a plurality of blades 528 which serve as an auger for systematically moving the cuttings from the dryer inlet 516 to the dryer outlet 518. The shaft 526 and blades 528 form an agitator assembly which is rotated by a motor 530 and gear reducer or drive variator 532. Processed cuttings 534 leaving the dryer outlet 518 are disposed of, for example, by being dropped into the sea.

A vacuum line 536 feeds vaporized oil, wash water, and other contaminants from the cuttings passing through the dryer 506 to the condenser 508. The condenser 508 cools and condenses the vapor by having water enter the condenser through a cooling fluid inlet 538 and exit the condenser via a cooling fluid outlet 540. The condensed vapor is transferred from the condenser 508 to the condensate column tank 510 along a line 542.

The column tank 510 has a lower fluid inlet 544 for supplying water to the tank as necessary to keep oil 546 floating atop water 548 in the tank at the level of an oil drain pipe 550. Thus, the vaporized oil, wash water and other contaminants driven off the cuttings in the dryer 506 are condensed in the condenser 508 and separated out in the condensate column tank 510 in a manner providing for the oil to be fed to an active system premix tank for reuse in an active mud system.

In circumstances where a 0-1% dry weight oil on cuttings end product is necessary, the thermal processor 500 is added to the separation system 10 (FIG. 3). The thermal processor 500 is a low temperature thermal system as it utilizes only 160°-200° C. heat source and, therefore, can use wet steam, dry steam or hot oil to transmit heat to the cuttings. The primary heat source can be a steam boiler or electrical elements.

In the practice of the present invention, after the drill cuttings have been washed in wash water, i.e. hot salt water and detergent, they are partially dried on the vibrating screen 16. This drains off the mud chemicals, emulsifiers, barite, etc., and the oil from the cuttings to better than 10% residual oil on cuttings by dry weight. A normal water content at this point is 12-18%. Since these results can be maintained within a narrow band, a subsequent thermal processing of these pre-washed and sized cuttings is very effective. As such, the thermal processor 500 can process more volume per hour at a lower temperature and with a more constant end product than other conventional systems. Additionally, the fine solids 514 discharged from the high speed rotating equipment 24 and 26 of the cyclonic column tank separation system 10 can be stored temporarily and processed by the thermal unit 500 during logging runs, tripping runs, or any time when very little or no cuttings 512 are being discharged from the primary drying screen 16. The heated hopper 502 greatly assists in the efficiency of the thermal processor 500, by heating the cuttings 512 and 514 before they are fed onto the set of rotating roller mills 504. The rollers 504 not only crush the cuttings to increase their surface area and release any oil trapped inside the cuttings, but also grade or size of the cuttings entering the dryer 506 to provide for a stable process rate and end product result. Thus, the prior removal of the majority of oil, water, fines and drilling mud chemicals, pre-heating, and crushing the cuttings before they enter the agitator dryer, results in a reduction in temperature requirement and higher process volume capacity and in doing so provides for the realization of a substantial reduction in physical dimensions, weight and power requirements of the dryer unit.

Conventional mineral thermal processors have failed in this application in the past due to the lack of control of the incoming product which forced the use of excessively high temperatures and greatly reduced the volume per hour, process rate. High temperature processors are not desireable offshore in a zone 1 or 2 area, as they constitute a source of gas ignition. However, a low temperature thermal process with a maximum temperature of only 200° C. is acceptable and falls within the maximum allowable surface temperature allowed offshore (200° C. as stated in the Statutory Instrument for Offshore Installation, Construction and Survey Regulation 1974 Si 289).

Thus, it will be appreciated that as a result of the present invention, a highly effective separation system and method is provided by which the principal object and others are completely fulfilled. It is contemplated and will be apparent to those skilled in the art from the foregoing description and accompanying drawing illustrations that variations and/or modifications of the disclosed embodiment may be made without departure from the invention. For example, although it is preferred that the first, second and third column tanks are each 50 BBL tanks, it is contemplated that tanks of different displacements may be used. Further, it is to be understood that the present invention is not limited to the removal of oil-based drilling muds from drill cuttings, but also finds applicability in removing other oil contaminants, such as, water-based muds having oil added for lubricity or other purposes.

Accordingly, it is expressly intended that the foregoing description and accompanying drawings are illustrative of preferred embodiments only, not limiting, and that the true spirit and scope of the present invention be determined by reference to the appended claims.

What is claimed is:

1. A system for removing oil or oil base drilling mud from drill cuttings using a continuous phase liquid, either aqueous or non-aqueous, and for separating for recirculation and reuse the removed drilling mud and the continuous phase liquid, said system comprising:

platform shakers for receiving cuttings contaminated with oil or oil base drilling mud and for flushing the cuttings with the continuous phase liquid in a manner delivering the cuttings an continuous phase liquid to a wash drum;

the wash drum agitating the cuttings and continuous phase liquid together so that the oil or oil base mud is removed from the cuttings and is dispersed in the continuous phase liquid;

a vibrating, drying screen for receiving the cuttings, continuous phase liquid and dispersed oil or oil mud from the wash drum, for separating the larger cuttings from the continuous phase liquid an dispersed oil or oil mud, for drying the separated out larger cuttings, and for feeding the separated and dried larger cuttings to an inspection and discharge location;

a catch pan and pump arrangement for collecting and delivering the continuous phase liquid, dispersed oil or oil mud, and small sized cuttings which pass through the drying screen to a first column tank;

the first column tank facilitating the settling of a dense suspension including oil, oil mud, emulsifiers and fine solids to the bottom of the tank;

a first column tank pump feeds the dense suspension from the bottom of the first column tank to at least one high "G" centrifuge;

the at least one centrifuge removing substantially all of the remaining cuttings from the liquid portion of the suspension, the separated out cuttings being transferred to a sampling an discharge location, the centrifugally separated out liquid portion containing continuous phase liquid, oil emulsifiers and very fine solid particles being delivered to a small catch tank and then transferred by a catch tank pump to a second column tank;

the second column tank allowing for further separation of a high density suspension to the bottom of the second column tank;

a third column tank receiving continuous phase liquid having fine solids, oil and oil mud suspended therein from the second column tank and allowing for the separation of higher density continuous phase liquid, tied up oil, emulsifiers, mud additives and fine solids to the bottom of the third column tank;

a continuous phase liquid line provides fluid communication between each of the first, second, and third column tanks at a high level on tank below the upper surface of the liquid in each tank;

a second column pump and a third column pump periodically draining the high density mixture from the bottom of each of the second and third column tanks into a recovered oil and emulsifier holding tank;

the liquid level in each of the first, second, and third column tanks being equalized by a high level equalizer line located at the liquid surface of each of the first, second, and third column tanks;

a holding tank pump feeding the recovered oil and emulsifiers from the recovered oil and emulsifier holding tank to an active system premix tank for reuse in an active mud system; and, a high level suction pump recycling the continuous phase liquid from the third column tank to the platform shakers, the continuous phase liquid being used to flush the contaminated cuttings from the platform shakers.

2. The system of claim 1, wherein said drying screen has a 120×120 mesh size so that cuttings of less than about 117 microns follow the liquid phase through said screen.

3. The system of claim 2, wherein the drying screen is tilted at about a 5 positive incline and incorporates a plurality of strip air amplifiers to facilitate the drying of cuttings prior to disposal.

4. The system of claim 3, wherein said drying screen has a screening area of about 32 square feet.

5. The system of claim 1, wherein each of said first, second and third column tanks are approximately 50 BBL tanks.

6. The system of claim 1, wherein said at least one high "G" centrifuge comprises a pair of 3250 RPM, 5 micron cut point centrifuges.

7. The system of claim 1, further comprising: heating means for heating said continuous phase liquid to improve washing and separation results.

8. The system of claim 1, further comprising:
a low temperature thermal processor for further reducing the oil content of said larger cuttings from said drying screen.

9. The system of claim 8, wherein said low temperature thermal processor also reduces the oil content of said separated out cuttings from said at least one centrifuge.

10. The system of claim 9, wherein said thermal processor includes a heated hopper for receiving said cuttings, crusher rollers for sizing said cuttings received by said hopper, an agitator dryer for drying said sized cuttings, and a condenser and condensate column tank arrangement for condensing the oil and contaminants removed from said cuttings by said agitator dryer.

11. The system of claim 1, wherein said continuous phase liquid is base oil.

12. The system of claim 1, further comprising: a hydrocyclone pump for feeding continuous phase liquid having dispersed oil therein from the midsection of the third column tank to a de-oiling, liquid/liquid hydrocyclone, the de-oiling hydrocyclone has an oil output stream which is fed to the recovered oil and emulsifier holding tank and a substantially oil free continuous phase liquid return which is fed back into the third column tank.

13. The system of claim 12, wherein said continuous phase liquid is a wash water solution,
wherein free oil floats to the liquid surface in each of said first, second, and third column tanks,
and wherein the recovered oil and emulsifier holding tank also receives free oil from the liquid surface of each of said first, second, and third column tanks through said high level equalizer line.

14. The system of claim 13, wherein said wash water is a salt water and neat detergent solution, and further comprising:
a bulk, neat detergent tank for supplying neat detergent to a salt water and detergent mixer,
the mixer provides a salt water detergent mix to the third column tank.

15. The system of claim 14, wherein the salt water to neat detergent ratio is about 97% salt water and 3% detergent.

16. The system of claim 15, wherein the de-oiling, liquid/liquid hydrocyclone reduces any oil circulating in the salt water/detergent wash water to about 40 PPM at a wash water process rate of about 8.5 BBL/MIN.

17. The system of claim 16, wherein said drying screen has a 120×120 mesh size so that cuttings of less than about 117 microns follow the liquid phase through said screen.

18. The system of claim 17, wherein the drying screen is tilted at about a 5° positive incline and incorporates a plurality of strip air amplifiers to facilitate the drying of cuttings prior to disposal.

19. The system of claim 18, wherein each of said first, second, and third column tanks is an approximately 50 BBL tank.

20. The system of claim 19, wherein said at least one high "G" centrifuge comprises a pair of 3250 RPM, 5 micron cut point centrifuges.

21. The system of claim 20, wherein said drying screen has a screening area of about 32 square feet.

22. The system of claim 21, further comprising: heating means for heating said wash water solution to improve washing and separation results.

23. The system of claim 22, further comprising:
a low temperature thermal processor for further reducing the oil content of said larger cuttings from said drying screen.

24. The system of claim 23, wherein said low temperature thermal processor also reduces the oil content of said separated out cuttings from said at least one centrifuge.

25. The system of claim 24, wherein said thermal processor includes a heated hopper for receiving said cuttings, crusher rollers for sizing said cuttings received by said hopper, an agitator dryer for drying said sized cuttings, and a condenser and condensate column tank arrangement for condensing the oil and contaminants removed from said cuttings by said agitator dryer.

26. The system of claim 1, wherein said continuous phase liquid is salt water with surfactants.

* * * * *

UNITED STATES PATENT AND TRADEMARK OFFICE
CERTIFICATE OF CORRECTION

PATENT NO. : 5,090,498

DATED : February 25, 1992

INVENTOR(S) : James Hamill

It is certified that error appears in the above-identified patent and that said Letters Patent is hereby corrected as shown below:

Column 8, line 16, delete "an" and insert therefor --and--;

Column 8, line 34, delete "an" and insert therefor -- and--;

Column 9, line 9, delete "5" and insert therefor --5°--.

Signed and Sealed this

Twenty-second Day of June, 1993

Attest:

MICHAEL K. KIRK

Attesting Officer

Acting Commissioner of Patents and Trademarks